(12) United States Patent
Schonfeld et al.

(10) Patent No.: US 8,241,739 B2
(45) Date of Patent: Aug. 14, 2012

(54) SHEET MOLDING COMPOUNDS (SMC), THICK MOLDING COMPOUNDS (TMC), AND BULK MOLDING COMPOUNDS (BMC) COMPRISING THERMOSETTING RESINS BASED ON RENEWABLE RESOURCES

(75) Inventors: Uwe Schonfeld, Schrozberg (DE); Oliver Turk, Ockenheim (DE); Giovanni Vargiolu, Filsen (DE); Klaus Dippon, Markt Erlbach (DE); Nicole Busam, Dessighofen (DE); Simone Weber, Ockenheim (DE)

(73) Assignees: Polynt S.p.A., Scanzorosciate (IT); Bio-Composites and More GmbH, Ipsheim (DE)

( * ) Notice: Subject to any disclaimer, the term of this patent is extended or adjusted under 35 U.S.C. 154(b) by 111 days.

(21) Appl. No.: 12/375,446

(22) PCT Filed: Jul. 27, 2007

(86) PCT No.: PCT/EP2007/006659
§ 371 (c)(1),
(2), (4) Date: Oct. 14, 2009

(87) PCT Pub. No.: WO2008/014931
PCT Pub. Date: Feb. 7, 2008

(65) Prior Publication Data
US 2010/0041802 A1 Feb. 18, 2010

(30) Foreign Application Priority Data
Jul. 30, 2006 (EP) .................................. 06015857

(51) Int. Cl.
*B32B 27/04* (2006.01)
*B32B 27/38* (2006.01)
*C08L 63/00* (2006.01)
*B29C 70/00* (2006.01)

(52) U.S. Cl. ..................... 428/297.4; 264/280; 428/413; 523/427; 525/524; 525/533

(58) Field of Classification Search ............... 264/176.1, 264/210.1, 211.64, 280; 428/297.4, 413, 428/417, 418; 523/400, 427, 466; 525/523, 525/524, 533
See application file for complete search history.

(56) References Cited

U.S. PATENT DOCUMENTS

| | | | |
|---|---|---|---|
| 4,542,192 A * | 9/1985 | Kraft et al. | 525/438 |
| 6,194,490 B1 * | 2/2001 | Roth et al. | 523/443 |
| 2001/0023276 A1 | 9/2001 | Schoenfeld | |
| 2003/0088007 A1 | 5/2003 | Wool et al. | |
| 2006/0258248 A1 * | 11/2006 | Shooshtari et al. | 442/327 |

FOREIGN PATENT DOCUMENTS

| | | |
|---|---|---|
| DE | 196 27 165 A1 | 1/1997 |
| EP | 0673957 A2 | 9/1995 |
| WO | WO 00/06632 A | 2/2000 |

OTHER PUBLICATIONS

European Search Report from European Patent Application Publication No. EP1884531, dated Dec. 18, 2006.

* cited by examiner

*Primary Examiner* — Michael J Feely
(74) *Attorney, Agent, or Firm* — Lisa V. Mueller; Michael Best & Friedrich LLP

(57) ABSTRACT

The object of the invention is a new Sheet Molding Compound (SMC), Thick Molding Compound (TMC), or Bulk Molding Compound (BMC) comprising at thermosetting resin on the basis of renewable resources with which molded parts can be produced in a molding process at elevated temperature and pressure said process being suitable to produce molded parts in an industrial process.

14 Claims, 3 Drawing Sheets

SHEET MOLDING COMPOUNDS (SMC), THICK MOLDING COMPOUNDS (TMC), AND BULK MOLDING COMPOUNDS (BMC) COMPRISING THERMOSETTING RESINS BASED ON RENEWABLE RESOURCES

This application is a 371 of PCT/EP2007/006659, filed Jul. 27, 2007, which claims priority under 35 USC Section 119(b) to EP application 06015857.3, filed on Jul. 30, 2006, all of which are herein incorporated by reference.

The present invention relates to a sheet molding compound (SMC), bulk molding compound (BMC), or thick molding compound (TMC) comprising a thermosetting resin based on renewable resources. According to the present invention, SMC and TMC comprising a resin based on renewable resources are preferred SMC comprising a resin based on renewable resources is particularly preferred.

Sheet molding compounds (SMC) provide fiber reinforced thermosetting resins in a form which allows processing in a molding process at elevated temperature and pressure in industrial applications where parts can be molded economically in numbers ranging from several thousands up to several millions of pieces per year.

SMC is characterized by relatively low tool cost, medium material price, and low cycle time rendering it ideal for production numbers between 10,000 and 100,000 parts per year. SMC is also an excellent material for the production of automotive parts.

Another important field of application is in electrical goods and appliances such as lamp housings, electrical cabinets, electrical switch boxes, and the like.

International standard ISO 8605 "Textile glass reinforced plastics—Sheet molding compound (SMC)—Basis for a specification" describes SMC in a classification based on the composition of the material as consisting fundamentally of resin (matrix)
reinforcement(s)
fillers
additives The modes of reinforcement are also specified in this classification.

To obtain a SMC applicable in practice at least six ingredients are necessary:
1) thermosetting resin
2) reinforcement fibers
3) thickening agent
4) initiator (curing agent)
5) inhibitor (stabilizer)
6) mold release agent Further ingredients are commonly used, e.g.:
7) fillers
8) additives (erg, for wetting, dispersing, air release, etc.)
9) shrinkage modifiers (thermoplastic low shrink or low profile additives for compensation of resin shrinkage)
10) colors/pigments In the following the ingredients and processes being relevant for the present invention are described in more detail:

1) Thermosetting Resin

As thermosetting resins in industrial SMC, TMC or BMC applications mostly unsaturated polyesters (UP) and vinyl ester (VE) resins are used. Depending on the demands on the SMC, TMC or BMC or on the molded parts, various combinations of diols and unsaturated dicarboxylic acids or the corresponding anhydrides can be used to form unsaturated polyesters: Typical acids or anhydrides are phthalic acid (or phthalic anhydride), isophthalic acid, terephthalic acid, and maleic acid (or maleic anhydride).

Typical diol components are 1,2-ethanediol (ethylene glycol), 1,2-propanediol (1,2-propylene glycol), 1,3-propanediol (1,3-propylene glycol), 1,3-butanediol, 1,4-butanediol, and 2,2-di-methyl-1,3-propanediol (neopentyl glycol).

For special applications or demands special combinations of acids and alcohols are used; e.g. isophthalic acid and neopentyl glycol form unsaturated polyesters with enhanced chemical resistance and especially weathering resistance.

Typical vinyl esters are such of the novolac type and such of the bisphenol A type which are mostly used to form SMC, TMC or BMC for the production of parts where there is a demand on temperature resistance and/or chemical resistance.

Unsaturated polyester or vinyl ester resins are typically dissolved in a monomer possessing a vinyl group like e.g. styrene. This monomer participates in the crosslinking reaction of the unsaturated polyester or vinyl ester started by an initiator (radical polymerization), a three dimensional network being formed by this copolymerization.

However, the thermosetting resin itself and especially the styrene constitute a potential health hazard to both the producers of the SMC, TMC or BMC and the molders. The molded parts can also emit unreacted styrene and other volatile substances, especially on the edges of the parts or where these have been cut or drilled in post production steps, thus exposing end-users to these volatile substances, too.

Volatile compounds emitted by molded parts can be measured and described by the VOC value which is a measure of the content of volatile organic compounds in the material. It is evident that the use of SMC, TMC or BMC parts in an automotive interior or in a living or working environment can be impeded by the emission of volatile organic compounds, as there are either legal restrictions or strong demands of the manufacturers, especially in the automotive sector, for products having low VOC values.

2) Reinforcement

The classical and still predominant way of reinforcing thermosetting resins is the usage of bundles of glass fibers, so called rovings. However carbon fibers, aramid fibers, basalt fibers (geotextile fibers) or natural fibers like hemp, flax, jute and the like can also be used. The reinforcement can also consist of fleeces or woven fabrics (multi-layered or single layered) of one or a mixture of two or more of the above reinforcement materials.

In the usual structure of a glass fiber roving several single glass fiber filaments having a diameter of typically 11 µm to 16 µm are bound together to form a bundle. Several bundles of fiber form the so called roving. The parameters describing the essential properties of such glass fiber rovings are the diameter of the elementary fiber, the linear density of the bundle which is given by the bundle tex number (in milligrams per meter), and the linear density of the complete roving, also given by the tex number (in milligrams per meter) of the roving. The linear density of a bundle e.g. in SMC rovings is typically in the range of 60 to 90 tex and the is linear density of SMC rovings is typically 2400 tex or 4800 tex.

The single filaments can only form the above-mentioned bundles by the use of a sizing which is applied onto the glass fibers. The sizing is usually a mixture of several liquid components, comprising an antistatic agent, a film former, a lubricant, and a coupling agent that facilitates the interaction between the glass fiber surface and the unsaturated polyester or vinyl ester resin. Only the sizing ensures the processability of the glass fibers in the SMC process; glass fibers without sizing are not processable e.g. due to the formation of fluff during the cutting process. The chemical composition and especially the solubility of the sizing are determinative of the defilamentation of the glass fiber bundles in the SMC production and/or during molding. High solubility of the sizing results in good defilamentation and dispersion of the glass fiber bundles, a transparent and homogeneous SMC and good mechanical properties of the molded part. However, mold flow is affected adversely, as completely defilamentized glass fibers lead to higher viscosities in the mold. On the other hand, low solubility of the sizing results in poor defilamentation and poor mechanical properties of the molded part. Mold flow however is facilitated.

3) Thickening Agent/Thickening Process:

The thickening process or maturation can be considered to be the fundamental step in the production of SMC, TMC, and also BMC. International Standard ISO 8604 notes in section 3.3.5. Sheet Moulding Compounds (SMC), in section 3.3.6. Thick Moulding Compounds (TMC), and in section 3.3.7. Bulk Moulding Compounds (BMC) for all materials or processes, respectively, "high viscosity is achieved by chemical thickeners".

3.1. Thickening Reaction.

In conventional SMC, TMC, and BMC based on thermosetting resins of petrochemical origin one makes use of a reaction of two terminal acid groups of unsaturated polyester chains with an alkaline earth oxide or hydroxide (Schemes 1. and 2.). By that two step reaction that can be called a bridging reaction polyester chains with a higher molecular mass are formed and the viscosity rises accordingly.

The water formed during that reaction builds up hydrogen bonds with neighbouring polyester chains—a process by which the molecular mass is increasing even more (Scheme 3.).

Finally, complexes between carbonyl atoms in the polyester chain and the alkaline earth metal atom in a neighboured polyester chain are formed (Scheme 4.) By this complex building reaction the density of the network is increased and the viscosity of the resin systems rises accordingly.

Thickening reactions of unsaturated polyester resins in Schemes 1. to 4. are given according to: Hamid G. Kia, "Sheet moulding compounds—science and technology", Hanser Publishers, Munich, 1993.

Scheme 1.: Thickening reaction of polyesters with alkaline earth oxides, here magnesium oxide. One mole of water is formed in the bridging of two terminal carboxyl groups of the polyester.

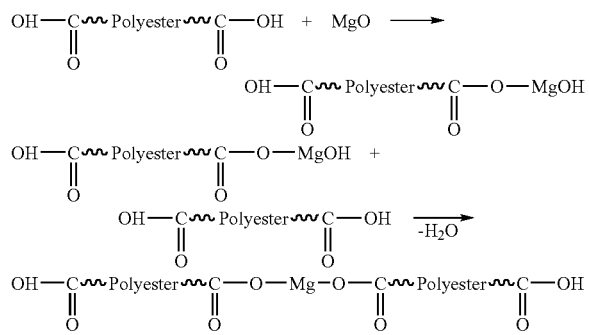

Scheme 2.: Thickening reaction of polyesters with alkaline earth hydroxides, here magnesiumhydroxide. Two moles of water are formed in the bridging of two terminal carboxyl groups of the polyester.

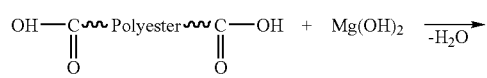

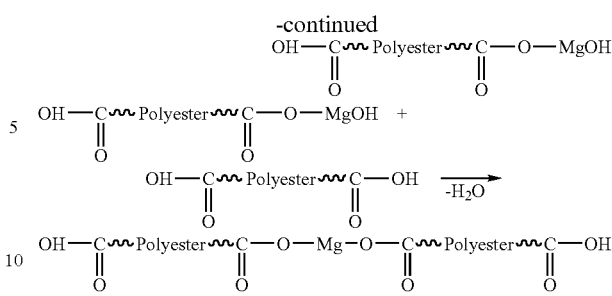

Scheme 3.: Hydrogen bonding between water (formed in the bridging reaction or contained e.g. in fillers or other ingredients) and carbonyl and ether oxygen atoms. By this hydrogen bonding the density of the network is increased and the viscosity of the resin systems rises accordingly.

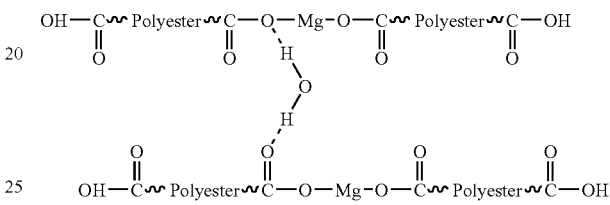

Scheme 4.: Formation of complexes between carbonyl atoms in the polyester chain and the alkaline earth metal atom in a neighboured polyester chain. By this complex building reaction the density of the network is increased and the viscosity of the resin systems rises accordingly.

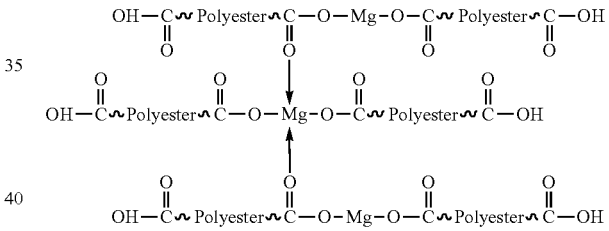

The molecular masses (given by the number average) of unsaturated polyester resins and vinylester resins can be in the range of 500 to 5000 g/mole. Typically, UP resins possess molecular masses of 1800-2200 g/mole and VE resins molecular masses of 800-1000 g/mole. The viscosity of such resins is usually in the range of 0.6 to 6 Pa s. This corresponds approximately to the viscosity of honey.

The viscosity of the resin paste, where the resin paste is understood to be the mixture of the thermosetting resin with all further components of the formulation with exception of the pigment paste and the thickening agent which form the colour paste is typically in the range of 5-50 Pa s.

The production of SMC is described in section SMC production, also the terms "resin paste" and "colour paste" are explained there. The thickening process increases this viscosity of the resin paste from this level of 5-50 Pa s up to a level of $5*10^4$ Pa s to $1*10^5$ Pa s. The rise of viscosity in the first five and a half hours is shown exemplary in FIG. 1. Such thickening of the UP resin paste then reaches a plateau after some days. After having reached a viscosity of $5*10^4$ Pa s to $1*10^5$ Pa s the SMC possesses a leather like appearance and enables the operator to cut the SMC into pieces of desired size, remove the carrier film without resin sticking to the film or to the hands of the operator, and to put the pre cut sheets into the mould.

During moulding, the viscosity level of the thickened thermosetting resin is lowered again due to the influence of the temperature in the mould. The decrease of viscosity is shown schematically in FIG. 2, where the different levels of viscosity corresponding to different process steps (resin→resin paste→thickened SMC→SMC in the mold→molded part) are given.

3.2. Necessity of Thickening.

The chemical thickening of the resin matrix in the compounds SMC, TMC, and BMC fulfills mainly three demands: Prevent phase separation in the resin matrix, enable easy handling of the material, and guarantee flow behaviour in the mould at high temperature and pressure.

A side effect of thickening of the resin matrix is that it opposes a phase separation of the components in the formulation which could otherwise take place as shelf life of SMC, TMC, and BMC is in the order of magnitude of several months.

For the handling of SMC and TMC it is mandatory to accomplish a thickening reaction in the resin. As described above the glass fibres are impregnated with a resin paste having a viscosity of 5-50 Pa s. A sheet of cut fibres impregnated with a paste having such a viscosity cannot be handled in an industrial process. This is also stated by International Standard ISO 8605 "Textile-glass-reinforced plastics—Sheet Moulding Compounds (SMC)—Basis for a specification" in section 8.1.: "At the time the product is used, it shall be possible to remove the barrier sheet easily without leaving any traces". Thus, viscosity has to be increased to a level that enables the processor to cut the sheets into a desired form, remove the carrier film without resin sticking to the film, and place the tack free sheets manually or by robot into the mould. Also in BMC thickening is necessary to obtain a tack free bulk material that allows any easy removal of the packaging and a transfer of the material into the mould.

Probably the most important aspect of thickening is connected to the mould flow behaviour of the compound. The decrease of viscosity allows the resin paste to flow in the mould and to fill the complete cavity within the comparatively short time of the moulding process. However, a certain level of thickening is necessary to assure the transport of the glass fibres by the resin paste. If the thickening level is too low due to an incorrect formulation of the SMC, bad maturation conditions, or wrong storage glass transport during moulding is incomplete and the edges of the moulded part show a lack of glass fibres which leads to unsatisfying mechanical properties in the edges of the moulded part or even breakages during demoulding or deflashing of the part or during post production steps like drilling and the like. Also a thickening level which is too high due to the above mentioned reasons can lead to problems as the cavity of the mould cannot be filled completely with the reinforced thermosetting resin during the moulding process. The consequences are moulded parts which show defects on the edges.

From the above it follows that the thickening process is the central step in the production of SMC, TMC, and also BMC—as only the thickened resin matrix makes these compounds applicable in the way which is attributed to these materials by the processors. More in particular, a viscosity profile across time of the shape of the one shown in FIG. 2 is critical for ensuring the fitness of a material for SMC, TMC or BMC.

SMC Production:

In the compounding process of a classical SMC based on UP or VE resins of petrochemical origin, the basic ingredients of the SMC, namely thermosetting resin, initiator (curing agent), inhibitor (stabilizing agent), and mold release agent, and further optional ingredients such as one or more fillers, thermoplastic additives or other additives are mixed in a non-continuous process in a mixer to form a resin paste (see Table 1 below).

In a separate mixing process, the pigment paste which gives the SMC or the molded part its final color and opacity is built up by mixing basic pigments pastes like red, yellow, blue, black and so on. White pigment pastes are commonly added to improve glass coverage and color homogeneity. Moreover, the thickening agent is usually added to the pigment paste according to the formulation (see Table 1 below).

TABLE 1

Basic composition of resin paste and pigment/paste in SMC production.

| Resin Paste | Pigment/Thickener Paste |
|---|---|
| Thermosetting resin | Colored pigment pastes |
| Initiator | White pigment paste |
| Inhibitor | Thickening agent |
| Mold release agent | |
| Filler(s) | |
| Additive(s) | |
| Thermoplastic additive(s) | |

As the thickening reaction starts immediately after mixing the thermosetting resin with the thickening agent, in a continuous or semi-continuous process the resin paste and the pigment/thickener paste are mixed on-line in a predetermined ratio in a suitable static or dynamic mixer immediately before the production of the SMC. However, for test purposes or small scale (batch-wise) production it is also possible to dispense with the preparation of a separate pigment/thickener paste and to mix all components in one step.

This mixture is then fed into a so-called doctor box which is a rectangular box with a slit on the lower side. A carrier film of polyethylene or polyamide is moving in production direction underneath the doctor box and a resin film is applied on the carrier film; the thickness of the resin film being determined by the height of the slit. The carrier film is then moving underneath a glass fiber cutter that cuts the continuous fibers (rovings) into pieces of typically 25 mm to 50 mm length. After that a second resin-covered carrier film is put on the first carrier film to form a sandwich-like sheet that is finally moving through a compacting unit where the impregnation of the fibers is improved by the pressure applied by rollers.

After compacting the SMC is wound onto rolls or folded into cardboard boxes and stored in a controlled environment for maturation which usually takes several days Maturation means the thickening process which leads to a tack-free, easy-to-handle sheet of fiber-reinforced thermosetting resin where the carrier film can be removed without resin sticking to the film or to the hands of the operator and the operator can cut the SMC into pieces of desired size and put the pre-cut sheets into the mold.

For further information about the SMC process see e.g. Hamid G. Kia, "Sheet Moulding Compounds—Science and Technology", Hanser Publishers, Munich, 1993 or Arno Gardziella, "Duroplastische Harze, Formmassen und Werkstoffe", Expert Verlag, Renningen, 2000.

Molding Process:

In the molding process SMC sheets are cut into pieces of size and shape corresponding to the mold or part size. To achieve reproducible properties in the molded part the dimension and the weight of the sheets have to be kept constant. After release of the carrier film the sheets are put into the mold and the mold is closed. The molding temperature is usually between 135° C. and 155>C. and molding pressure between 30 bar and 100 bar, depending on the size and complexity of the mold or part. Mold flow properties of the SMC itself also have a strong influence on the required molding pressure. The molding time is usually between two and five minutes, however very "fast" SMC formulations can be cured within 50 seconds and the molding of very thick parts may require times of up to 10 minutes.

As a rule, molds are made from steel; usually they are chrome-plated to facilitate demolding and to increase the surface quality of the molded parts.

Shelf Life:

In SMC based on UP or VE resins with conventional thickening a viscosity level that allows to handle the material without resin sticking to the hands of the operator and the carrier film is reached after several days. This viscosity level is maintained for a comparatively long time which guarantees a shelf life of up to several months, also depending on the initiator system. The faster (in terms of curing time) the formulation is, the shorter is the shelf life of the material. Type and amount of the initiator(s) and inhibitor(s) have to be chosen carefully to guarantee the shelf life required by the processors of the material.

Low Emission SMC:

SMC based on UP or VE resins showing relatively low emission of volatile organic compounds (VOC) is known in the art. Pans molded from low emission SMC based on UP resins and reinforced with standard amounts of glass fibers (i.e. approximately 30 wt. %) are nowadays reaching emission values of around 200 ppm (VOC). The compounds contributing to this value are decomposition products of the initiators, such as alkyl-substituted alkanols. This is the result of a compromise one has to make in composing an SMC: On the one hand it is possible to set up formulations with a rather low content of initiator; however this results in high concentrations of unreacted styrene in the final product. On the other hand, high contents of initiator lead to lower contents of unreacted styrene due to increased crosslinking, but also to higher concentrations of decomposition products. The secret of a low emission SMC formulation is to find the right balance between these two extremes.

Waste Management:

In view of the increasingly restrictive legislation on waste management producers of fiber-reinforced plastics have to find a way to ensure that these materials can also be used in the future. A company named European Composite Recycling Concept (ECRC) has been founded to set up a waste management concept. One part of the concept is the use of shredded FRP waste in the cement industry where the material can contribute to the cement process both as fuel for the process and as raw material for the cement itself. It is still to be noted that this concept is not $CO_2$-neutral and material of fossil or petrochemical origin is burnt

DESCRIPTION OF THE BACKGROUND ART

An overview of biopolymers is given in G. Ebert, "Biopolymers", B. G. Teubner, Stuttgart, 1993>and E. S. Stevens, "Green Plastics—An Introduction to the New Science of Biodegradable Plastics", Princeton University Press, Princeton, N.J., 2002.

Apart from the classification of biopolymers according to their chemical nature, plastic material in general can be divided into thermoplastic, thermoset, and elastomeric materials according to German Industry Standard DIN 7742, part 2 (classification according to the temperature dependence of their modulus of shear deformation).

In the following description of prior art this classification will be used.

Thermoplastic Systems:

The use of biopolymers or compounds from renewable resources that can be processed like thermoplastic materials has been extensively described. In many cases mixtures of natural polymers and synthetic polymers are used to ensure the processability required for compression molding or injection molding.

Frequently used matrix materials in fiber reinforced compounds are thermoplastically processable starch, lignin, and shellac. WO-A-00/27924 teaches the use of lignin and shellac together with natural fibers as a raw material for an injection molding process.

An example of a polymer obtained by polymerization of a native monomer is poly(lactic acid) (PLA). Lactic acid can be polymerized to yield a low molecular weight polymer that can be treated with coupling agents to form poly(lactic acid) (PLA) of higher molecular weight. High molecular weight PLA with better mechanical properties can be obtained via metal-catalyzed ring opening polymerization of the cyclic dimer of lactic acid.

It is known that such thermoplastic materials often suffer from poor mechanical properties, i.e. low tensile and flexural strength and also low tensile and flexural modulus. Moreover, low glass transition temperatures ($T_g$ values) limit their applicability. An overview of the mechanical properties of thermoplastic biopolymers is given by U. Riedel, 1999, "Entwicklung und Charakterisierung von Faserverbundwerkstoffen auf der Basis nachwachsender Rohstoffe" VDI-Fortschrittberichte Reihe 5, Nr, 575, VDI-Verlag GmbH 1999 Düsseldorf.

Thermosetting Systems:

Thermosetting polymers of natural origin are known for a long time, as shellac—which can be processed like a thermoplastic material—can also be polymerized, i.e. show a thermosetting behavior. U.S. Pat. No. 2,010,227 teaches the use of asbestos as fibrous reinforcement and shellac as a thermosetting matrix material that reacts with polycarboxylic acids to yield a composite material which is said to have enhanced mechanical properties and thermal resistance.

U.S. Pat. No. 5,948,706 describes mixtures of shellac with crosslinking agents like oxalic acid, urea, aluminum chloride, ammonium zirconium carbonate, and ammonium compounds. The mixtures are used together with natural fibers like ramie, flax, sisal, jute, and hemp.

There are also examples of thermosetting biopolymeric resin systems on the basis of triacylglycerols which can be processed in a manner similar to conventional thermosetting resins. U.S. Pat. No. 6,900,261 teaches the use of an unsaturated polymer resin on the basis of a natural triglyceride oil in a sheet molding compound application. The triglyceride oil which can stem from soybean, linseed, rapeseed and the like is functionalized with carboxyl groups and/or hydroxyl groups and ethylenically unsaturated groups. The carboxyl groups provide the possibility for thickening reactions as described above. The ethylenically unsaturated functionalities are used for crosslinking reactions with ethylenically unsaturated monomers, preferably those with vinyl functionality like styrene, methylstyrene, and methyl methacrylate, i.e. the classical way of crosslinking via radical copolymerization using conventional initiators like benzoyl peroxide or methyl ethyl ketone peroxide and conventional accelerators like cobalt octoate and inhibitors like p-benzoquinone.

WO-A-00/06632 describes composite materials based on renewable resources. The components of the resin matrix are ring opening products made from epoxidized fatty substances and unsaturated short chain carboxylic acids and/or anhydride-modified fatty acids.

U.S. Pat. No. 6,121,398 describes the use of hydroxylated plant or animal oil which is maleinized and copolymerized with a vinyl group-containing reactive monomer such as styrene or methylstyrene. Said oil is used as a basis to form molding compounds together with artificial or natural fibers. High values of tensile strength and tensile modulus can be reached by using woven glass fiber mats.

In WO-A-97/02307 a polymeric material based on renewable raw materials has been described which is based on 10-90 wt. % of a triglyceride having at least two epoxy and/or aziridine groups and 5-90 wt. % of a polycarboxylic acid anhydride with 0.01-4 wt. % of a polycarboxylic acid. From the chemical point of view it belongs to the class of aliphatic epoxy resins and it possesses properties similar to those of common thermosetting resins. In the curing process of these resins, which may be described by the reaction sequence depicted in Scheme 5 below, small amounts of (poly)carboxylic acids adopt the function of a reaction starter or initiator. Since the epoxy groups of an epoxidized triglyceride are relatively unreactive, the curing process requires high temperatures of e.g. 130 to 180° C. The resulting substances are polyesters, the properties of which depend to a great extent on the fatty-acid spectrum of the native oils employed. Also disclosed is the use of such polymeric materials in combination with inorganic fillers like carbonates, flame retardant fillers such as aluminum trihydroxide, fibers like flax or glass, and also organic fillers based on renewable resources like sawdust, straw, wool, and the like and the application of such polymeric materials in pultrusion and wet molding processes. Such polymeric materials are commercially available under the trade name PTP®.

Scheme 5: Reaction scheme for polymerization of thermosetting resins based on epoxidized triglycerides

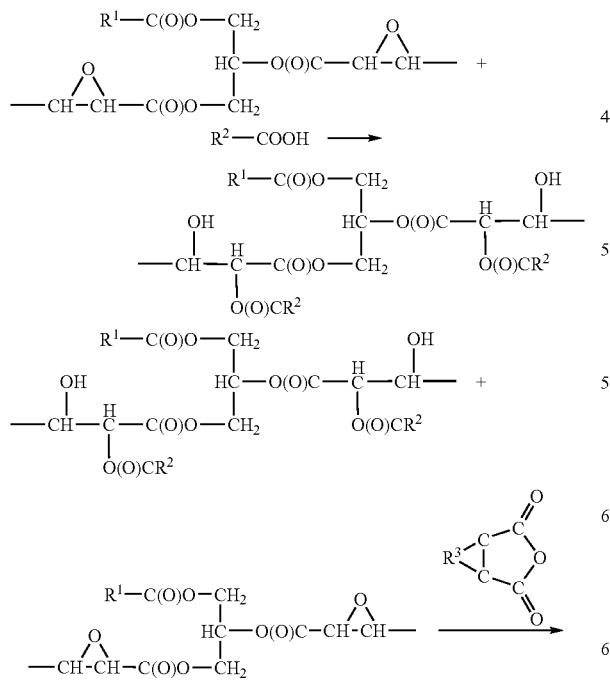

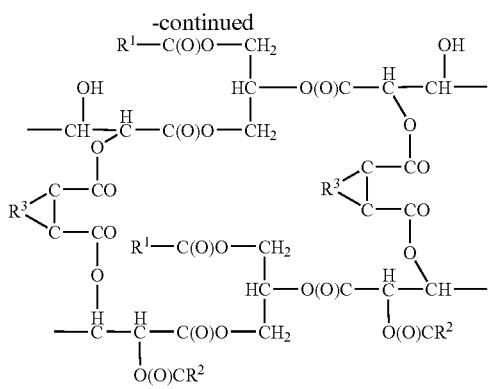

In the above scheme, $R^1$ at each occurrence independently forms an optionally epoxidized fatty acyl group together with the adjacent carbonyl group. The epoxy moieties (or the moieties formed in their reaction with the carboxylic acids or anhydrides) and the carbonyl groups of the triglyceride acyl groups are usually separated by one or more saturated or unsaturated carbon atoms which have been omitted for simplicity of illustration $R^2$ at each occurrence independently is preferably selected from the group consisting of saturated and unsaturated $C_{1-40}$ aliphatic moieties and aryl groups, bearing at least one additional carboxy group and optionally being further substituted with hydroxy, oxo or alkoxycarbonyl groups; and $R^3$ preferably represents either two monovalent moieties independently selected from optionally substituted saturated and unsaturated $C_{1-10}$ aliphatic groups, or a bivalent moiety which, together with the adjacent carbon atoms, forms an alicyclic, aromatic or heteroaromatic ring or an alicyclic or aromatic bi- or polycyclic ring system.

The reaction of epoxide moieties with polycarboxylic anhydrides is depicted in more detail in Scheme 6 below.

Scheme 6: Reaction with carboxylic anhydrides forming branched polyester chains.

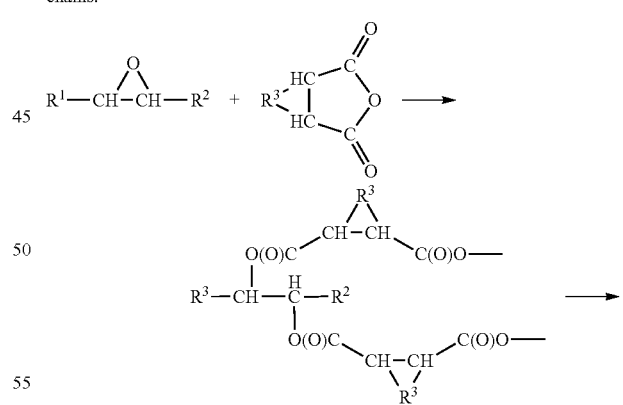

In Scheme 6, $R^1$ and $R^2$ independently are organic moieties, preferably forming together with the epoxide moiety an epoxidized triglyceride as indicated above, and $R^3$ is as described above for Scheme 5.

However, apart from these examples, thermosetting biopolymers—either native or formed by polymerization of native monomers—are still very rare compared to the wide variety of thermoplastic biopolymers.

Under the threat of a global climate change there is a need for materials which are neutral in $CO_2$ emission over their life. A well-known example is the increasing use of composites comprising natural fibers like hemp, flax, or jute in the interiors of motor vehicles. There is also increasing interest in composite materials comprising resins and binding agents which can be obtained from renewable raw materials.

However, in the field of thermosetting composites for industrial applications up to now only resins of petrochemical origin like unsaturated polyester (UP) and vinyl ester (VE) resins are being used. These resins are not $CO_2$ neutral with regard to their life cycle and will therefore fall under the limitations of incineration stipulated in recent waste management legislation.

It is therefore an object of the present invention to provide a SMC, TMC and BMC comprising a resin based on renewable resources. Parts molded from such an SMC, TMC and BMC could possibly be incinerated or even composted without contributing to the increase of atmospheric carbon dioxide as the resins have been formed—at least to a very large extent—by renewable materials.

As mentioned above, conventional SMC, TMC or BMC based on VE or UP resins leads to emissions of volatile organic compounds (VOC) such as styrene, thus posing a potential risk to the health of the end-user of the product, i.e. the molded part, and the people getting in contact with the intermediate product, i.e. the uncrosslinked SMC, TMC or BMC during the production of both the molded part and the SMC, TMC or BMC itself.

It is therefore another object of the present invention to provide a SMC, TMC and BMC without emission of volatile organic compounds (VOC) of petrochemical origin.

As described above, the maturation or thickening process is the decisive step in SMC, TMC and BMC production as only by thickening the liquid and/or sticky resin adopts a consistency allowing to handle the material in an industrial process Viscosities of $5\times10^4$ to $1\times10^5$ Pa s are necessary or typical. However, the classical thickening reaction with alkaline earth oxides and/or hydroxides cannot be carried out in resins based on renewable resources.

It is therefore still another object of the present invention to provide a SMC, TMC and BMC comprising a resin based on renewable resources which can accomplish a reaction that, after a certain maturation time, leads to a viscosity level providing a SMC, TMC and BMC where the carrier film can be removed without resin sticking to the film and/or the hands of the operator.

In conventional SMC, TMC or BMC based on UP or VE resins the viscosity of the matrix is lowered in the molding process due to the influence of temperature and pressure. This behavior is important as it allows the SMC, TMC and BMC to fill the cavity of the mold within the short time of the molding process.

It is therefore an object of the present invention to provide a SMC, TMC and BMC comprising a resin based on renewable resources which shows a mold flow behavior similar to that of a SMC, TMC and BMC based on UP or VE resins.

Shelf life of SMC, TMC and BMC after maturation is a very important property. In practice SMC, TMC and BMC need a shelf life of at least several weeks as the material has to be shipped to the customer and it must be possible to store the material at the customer's location for a certain period of time, during which the key properties of the material have to remain essentially the same.

As it is known that moisture adversely affects the stability of some uncured resins based on renewable resources such as PTP resin, it is also an object of the present invention to provide a SMC, TMC and BMC based on renewable resources which is not susceptible for curing by moisture which is contained in the formulation or which migrates into the material during storage.

It is another object of the present invention to provide a SMC, TMC and BMC comprising a resin based on renewable resources which can be processed in a SMC, TMC or BMC process which is basically identical with the process which is used to produce SMC, TMC or BMC based on unsaturated polyester (UP) resins or vinyl ester (VE) resins and which can be used in molding process similar to standard SMC, TMC or BMC molding process leading to molded parts with mechanical properties comparable to those obtained with standard SMC, TMC or BMC.

In prior art the use of modified triglycerides from plant oils together with glass fiber or natural fiber mats for the production of molding compounds with high tensile modulus is described. Apart from the fact that complex geometries of molded parts cannot be realized with woven mats, molds had to be heated for several hours which is much too long for the production of parts in an industrial process.

It is therefore an object of the present invention to provide a SMC material comprising a resin based on renewable resources and cut glass fibers with a length of 25 mm and/or 50 mm with which complex geometries in molded parts can be realized in molding times not exceeding several minutes.

Additionally, it is an object of the present invention to provide such an SMC, TMC and BMC having mechanical properties such as tensile strength/tensile modulus and flexural strength/flexural modulus comparable to those of SMC, TMC or BMC based on conventional UP and VE resins.

In SMC, TMC or BMC based on UP or VE resins, internal mold release agents are used to enable or facilitate demolding of the molded part Common mold release agents are metal stearates like zinc stearate or calcium stearate which have been used in SMC, TMC or BMC based on UP or VE resins for decades, but mold release agents on the basis of surface active substances and polymers are also known.

It is therefore a further object of the present invention to provide a SMC, TMC and BMC comprising a resin based on renewable resources which is compatible with common internal mold release agents.

As described above, compounds or composites based on renewable resources can mostly be considered as thermoplastic compounds in the sense of the definition given in German Industry Standard DIN 7742 part 2. It is known from conventional compounds—i.e. those based on polymers of petrochemical origin—that the mechanical properties of fiber reinforced thermosetting compounds like SMC, TMC and BMC are better than those of fiber reinforced thermoplastic materials like long fiber reinforced thermoplastics (LFT) and glass mat reinforced thermoplastics (GMT).

It is therefore a further object of the present invention to provide a SMC, TMC and BMC based on resins from renewable resources that possesses mechanical properties superior to those typical for thermoplastic fiber reinforced plastics.

According to the invention, these objects are achieved by the SMC, TMC and BMC compounds of claim 1.

It has been found that resin systems based on triglycerides having at least two epoxy groups, polycarboxylic anhydrides, and polycarboxylic acids have a viscosity suitable to use these resins in a SMC, TMC or BMC process, i.e., in such a way that the impregnation of the glass fiber rovings is on the same level as known from conventional SMC, TMC or BMC based on UP or VE resins. Since no vinyl group-containing monomers such as styrene are used in these resin systems, such monomers do not contribute to their organic emissions (VOC). Here and hereinbelow, the term "polycarboxylic acid" is to be understood to encompass any carboxylic acid having at least two carboxy groups. Accordingly, the term "polycarboxylic anhydride" is to be understood to encompass any anhydride derived from a polycarboxylic acid by intramolecularly forming one or more anhydride moieties from one or more pairs of carboxy groups.

It has further been found that the addition of epoxides with at least one terminal epoxy group or cycloaliphatic or heterocyclic compounds with one or more epoxy groups per molecule to mixtures of epoxidized triglycerides with at least two epoxy groups per molecule, polycarboxylic anhydrides, and polycarboxylic acids, which are known to undergo crosslinking reactions only at elevated temperatures, leads to resin pastes that can undergo a thickening reaction at room temperature and thus be used in a SMC, TMC or BMC application. It is also possible to use epoxides having both types of epoxy groups, or mixtures of two or more of the above additional epoxides. Epoxides with terminal epoxy groups may be glycidyl ethers or esters, such as 1,4-cyclohexanedimethanol diglycidyl ether or glycidyl laurate, or may be produced by epoxidizing compounds containing vinyl groups or other terminal carbon-carbon double bonds. Suitable cycloaliphatic or heterocyclic epoxides may belong to the group of epoxidized cycloaliphatic or heterocyclic compounds with 4 to 7 ring atoms.

The reaction of cycloaliphatic diepoxides with polycarboxylic anhydrides is depicted in Scheme 7 below.

Scheme 7: Reaction of cycloaliphatic diepoxides with polycarboxylic anhydrides.

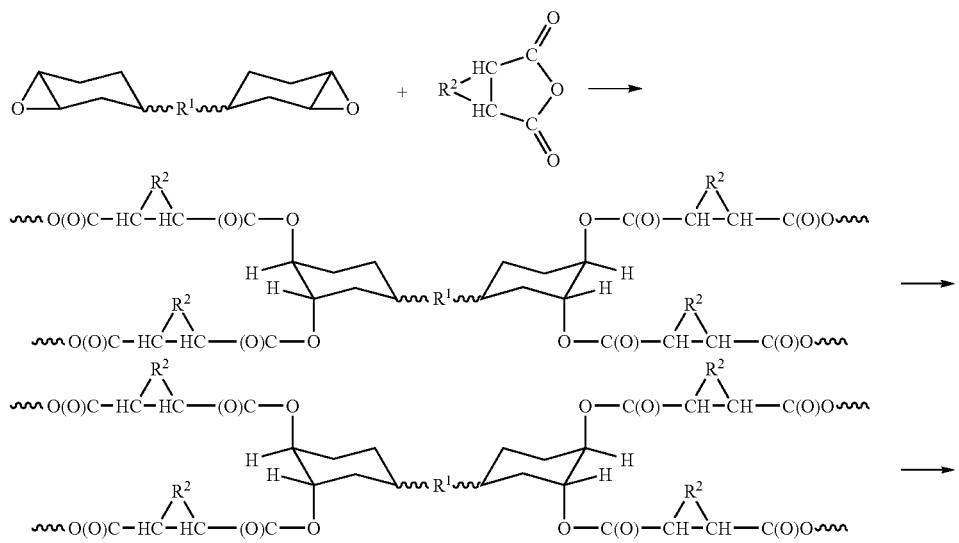

In Scheme 7, $R^1$ may be any divalent organic moiety, such as an alkylene or —$CH_2$—OC(=O)— group while $R^2$ has the same meaning as $R^3$ in Schemes 5 and 6 above.

Terminal epoxides having additional reactive functional groups, such as (3-glycidyloxypropyl)-trimethoxysilane, may also be fixed on suitable carrier materials, as depicted in Scheme 8 below.

Scheme 8: Reaction between epoxysilane and hydroxyl groups on mineral surfaces.

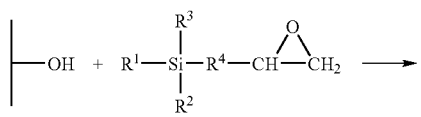

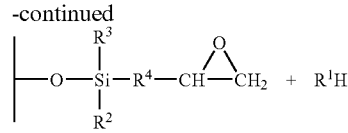

In Scheme 8, $R^1$ may be any organic or inorganic group that can react with a hydroxy group to form an oxygen-silicon bond. Preferably, $R^1$ is a lower alkoxy group such a methoxy or a halogen such as chlorine. $R^2$ and $R^3$ are preferably lower alkyl or alkoxy groups such as methyl or methoxy. $R^4$ may be any divalent organic moiety, preferably an optionally oxygen-interrupted alkylene group and most preferred a —$(CH_2)_3$—O—$CH_2$— group.

Thickenable resins suitable for a SMC, TMC or BMC application can also be obtained by the use of primary and secondary amines or quaternary ammonium compounds or C—H-acidic compounds in addition to the terminal, cycloaliphatic or heterocyclic epoxides mentioned above. Basically, all primary and secondary amines with at least two amine groups can be used. These can also be fixed on suitable carrier materials by ion exchange or by chemical reactions forming a covalent bond. Preferably, carrier materials from the group of silicates, especially layered silicates can be used. Also preferred are amines which are obtained by the introduction of at least two amino groups in the side chains of a triglyceride. Preferred is the introduction of primary and secondary amine groups. These can additionally be reacted with electrophilic agents with at least two functional groups during the maturation or thickening of the resin paste. Preferred are such electrophilic agents that can be obtained on the basis of renewable resources especially polyepoxides with at least two terminal epoxy groups as they can be obtained e.g. from phenolic containing or resorcinol containing substances of natural origin like e.g. cashew nutshell oil.

From the group of quaternary ammonium compounds basically all quaternary ammonium compounds can be used that possess at least one quaternary ammonium group. Preferred are alkyl quaternary ammonium compounds, more preferred are ammonium salts of mono- or polycarboxylic acids.

Quaternary ammonium salts can also be fixed on suitable carrier materials, e.g. by ion exchange. Preferred carrier materials are those mentioned above.

A proposed mechanism for the reaction between primary or secondary amines or amides, polycarboxylic anhydrides and epoxides is depicted in Scheme 9 below.

Scheme 9: Reaction of amines or amides with polycarboxylic anhydrides and epoxides, forming branched amide/ester copolymer chains after forming a carboxamide with the carboxylic anhydride and subsequent ring opening of the epoxide.

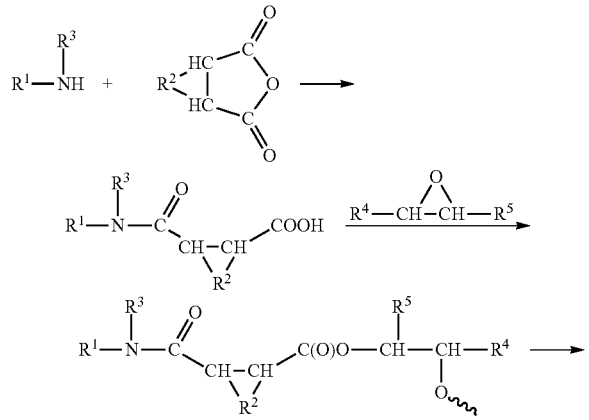

In Scheme 9, $R^1$ may be hydrogen or hydrocarbyl, $R^2$ has the same meaning as in Scheme 7 above, $R^3$ may be hydrocarbyl or acyl, or $R^1$ and $R^3$ together with the azanediyl (NH) group form a saturated or unsaturated mono- or polycyclic system, and $R^4$ and $R^5$ have the same meanings as $R^1$ and $R^2$ in Scheme 6 above.

According to the invention, there is provided a resin paste for the application in a sheet molding compound, a thick molding compound or a bulk molding compound, said resin paste comprising
  (a) 30 to 95 parts by weight of at least one epoxidized triglyceride having at least two epoxy groups,
  (b) 5 to 90 parts by weight of at least one polycarboxylic anhydride,
  (c) 0.001 to 20 parts by weight of a polycarboxylic acid,
  (d) 0.1 to 40 parts by weight of at least one terminal, cycloaliphatic or heterocyclic epoxy compound, and
  (e) 0 to 40 parts by weight of a composition comprising at least one compound selected from the group consisting of quaternary ammonium compounds, primary amines, secondary amines, carboxamides, N-substituted carboxamides, epoxidized alkoxysilanes, C—H-acidic compounds and mixtures thereof.

Preferably, the relative amounts of components (a) through (e) are such that the parts by weight add up to 100.

As epoxidized triglyceride, any compound obtainable by epoxidizing at least two double bonds of a triglyceride having two or more double bonds in its acyl moieties can be used. The two or more epoxidized double bonds may be present in only one, in two, or in each of the three acyl moieties of the triglyceride. As the epoxidized triglycerides are derived from naturally occurring triglycerides which in turn are usually derived from mixtures of fatty acids of various chain lengths and degrees of unsaturation, the number and position of epoxy groups may vary from molecule to molecule. Non-limiting examples of suitable naturally occurring triglycerides are fats and fatty oils such as soya oil, linseed oil, perilla oil, tung oil, oiticica oil, safflower oil, poppy oil, hemp oil, cottonseed oil, sunflower oil, rape oil, euphorbia iagascae oil, euphorbia lathyris oil, peanut oil, olive oil, olive seed oil, almond oil, kapok oil, hazelnut oil, apricot seed oil, beechnut oil, lupine oil, maize oil, sesame oil, grapeseed oil, lallemantia oil, castor oil, oils of marine animals such as herring oil, sardine oil, menhaden oil or whale oil, or mixtures of any of the preceding. A particularly preferred epoxidized triglyceride is epoxidized linseed oil.

In a preferred embodiment, the resin paste comprises 40 to 70 wt. %, more preferably 45 to 60 wt. % of the at least one epoxidized triglycerides.

All amounts given in percent by weight (wt. %) here and below are based on the sum of the amounts of components (a) to (e) as 100 wt. %.

As polycarboxylic anhydrides, any anhydrides formed by intramolecular water elimination of polycarboxylic acids (cf. below) may be employed. These may be derived from acyclic polycarboxylic acids such as maleic anhydride (from maleic acid) or succinic anhydride (from succinic acid), or from cyclic or polycyclic non-aromatic, aromatic or heteroaromatic polycarboxylic acids, such as phthalic anhydride, tetrahydrophthalic anhydride, hexahydrophibalic anhydride, trimellitic anhydride, pyromellitic dianhydride, 1,2-, 2,3- and 1,8-naphthalic anhydrides, 1,4,5,9-napthalenetetracarboxylic dianhydride, quinolinic anhydride, diphenic anhydride, norbornenedicarboxylic anhydride, and any mixtures or substitution products thereof Tetrahydrophthalic anhydride is preferred. Particularly preferred are such polycarboxylic anhydrides which are liquid at room temperature like methylhexahydrophthalic anhydride, methylendomethylentetrahydrophthalic anhydride, methyltetrahydrophthalic anhydride, and citraconic anhydride.

In a preferred embodiment, the resin paste comprises 25 to 45 wt. %, more preferably 30 to 40 wt. % of the at least one polycarboxylic anhydride.

Polycarboxylic acids include, without being limited thereto, citric acid, polymerized tall oils, azelaic acid, gallic acid, dimerized or polymerized oleoresin acids, dimerized or polymerized anacardic acid, cashew nut shell liquid, polyuronic acids, polyalginic acids, aromatic polycarboxylic acids such as mellitic acid, pyromellitic acid, trimesic acid, trimellitic acid, phthalic acid, isophthalic acid and terephthalic acid, substituted aromatic polycarboxylic acids such as methylphthalic acid, di- and polycyclic aromatic polycarboxylic acids such as naphthalenedicarboxylic and naphthalenetetracarboxylic acids, mono-, bi- and polycyclic cyloaliphatic polycarboxylic acids such as cyclopropane-, cyclobutane-, cyclopentane- and cyclohexanedicarboxylic acids or tetrahydrophtbalic acid, heterocyclic polycarboxylic acids such as pyridinedicarboxylic acids, open-chain polycarboxylic acids such as oxalic, malonic, succinic, glutaric, adipic, maleic or fumaric acid, and any substituted congeners or mixtures of the preceding. Among these, dicarboxylic and tricarboxylic acids are preferred A particularly preferred polycarboxylic acid is citric acid.

In a preferred embodiment, the resin paste comprises 0.01 to 10 wt. %, more preferably 0.05 to 2 wt. % of the at least one polycarboxylic acid.

As terminal, cycloaliphatic or heterocyclic epoxy compounds, epoxides with at least one terminal epoxy group or cycloaliphatic or heterocyclic compounds with one or more epoxy groups per molecule may be employed. It is also possible to use epoxides having both types of epoxy groups, or mixtures of two or more of the above additional epoxides. Epoxides with terminal epoxy groups may be glycidyl ethers or glycidyl esters, such as 1,4-cyclohexanedimethanol diglycidyl ether or glycidyl laurate, or silicon compounds such as (3-glycidyloxypropyl)trimethoxysilane, which may also be bound to a suitable carrier, or may be produced by epoxidizing compounds containing vinyl groups or other terminal carbon-carbon double bonds. Suitable cycloaliphatic or heterocyclic epoxides may belong to the group of epoxidized cycloaliphatic or heterocyclic compounds with 4 to 7 ring atoms. Most preferred cycloaliphatic epoxides are those having at least one epoxidized cyclohexane ring, such as 3,4-epoxycyclohexylmethyl 3',4'-epoxycyclohexanecarboxylate, or epoxidized terpene hydrocarbons, such as limonene dioxide. Further preferred epoxides are those which can be obtained from renewable resources, such as modified triglycerides having terminal epoxy groups, e.g. the products obtained by esterifying hydroxylated triglycerides with acrylic acid and epoxidizing the acrylate intermediate, or epoxidized products of the metathesis of unsaturated fatty acid alkyl esters with ethene as described by S. Warwel in *Chemosphere*, 2001, 43, 39.

Particularly preferred are epoxy compounds which are liquid at room temperature.

In a preferred embodiment, the resin paste comprises 0.1 to 20 wt. %, more preferably 5 to 10 wt. % of the at least one terminal, cycloaliphatic or heterocyclic epoxy compound.

As quaternary ammonium compounds, basically all quaternary ammonium compounds can be used, quaternary alkylammonium compounds being preferred. More preferred are quaternary ammonium compounds which are obtainable from natural resources, such as the quaternization products of fatty amines, e.g. stearyl trimethyl or cetyl trimethyl ammonium compounds.

As primary or secondary amines, basically all compounds having at least one primary and/or secondary amino group can be used. Suitable amines include, without being limited thereto, acyclic aliphatic amines such as alkyl- or dialkylamines, alicyclic amines such as cyclohexylamine or dicyclohexylamine, aromatic amines such as aniline or substituted anilines, and heterocyclic amines such as piperidine, morpholine or imidazole. More preferably, the primary or secondary amine or mixture of amines has at least two amino groups, such as ethylene diamine, 1,6-diaminohexane or piperazine. The amines may also have additional functional groups, such as alkoxycarbonyl groups like methyl 10-aminodecanoate. More preferably, the amines are derived from natural products, such as fatty amines or aminotriglycerides. Especially preferred are amines which are liquid at room temperature.

As carboxamides or N-substituted carboxamides, any compounds having at least one carboxamido group with at least one hydrogen attached to the amide nitrogen can be used, including urethanes and ureas.

As epoxidized alkoxysilanes, compounds such as (3-glycidyloxypropyl)trimethoxysilane or substitution or coupling products thereof may be used.

Suitable C—H-acidic compounds include, without being limited thereto, p-dicarbonyl compounds, for example β-ketoesters, such as alkyl acetoacetates or alkyl benzoylacetates, β-diketones, such as acetylacetone, and derivatives of malonic acid such as malonates, Meldrum's acid and malonodinitrile.

In a preferred embodiment, the component (e) comprises at least one quaternary ammonium compound In another preferred embodiment, the component (e) comprises a primary or secondary amine or a mixture of two or more primary and/or secondary amines.

In still another preferred embodiment, the component (e) comprises an epoxidized alkoxysilane.

In yet another preferred embodiment, the component (e) comprises at least one C—H-acidic compound.

Preferably, at least one of the compounds of component (e) is adsorbed on or covalently bound to a carrier material. More preferably, the carrier material is selected from the group consisting of layered silicates, such as vermiculite or montmorillonite, silica, such as quartz or cristobalite, glass, and mixtures thereof.

According to the invention, there is also provided a molding compound comprising the resin paste as described above, reinforcing fibers, and, optionally, one or more additional ingredients selected from the group consisting of thermoplasts, such as polyethylene, initiators, inhibitors, mold release agents, such as calcium stearate, fillers, such as aluminum hydroxide or calcium carbonate, nanofillers, such as barium sulfate, absorbents, such as molecular sieves, processing additives, wetting and dispersing additives, air release additives, shrinkage modifiers, and colorants.

In a preferred embodiment, the reinforcing fibers are glass fibers,

Another object of the invention is a molded article comprising a reaction product of the components of the above SMC, BMC or TMC molding compounds.

According to the invention, there is also provided a process for preparing a sheet molding compound, a thick molding compound or a bulk molding compound, said process comprising impregnating reinforcing fibers with a resin paste comprising
- (a) 30 to 95 parts by weight of at least one epoxidized triglyceride having at least two epoxy groups,
- (b) 5 to 90 parts by weight of at least one anhydride of a polycarboxylic acid,
- (c) 0.001 to 10 parts by weight of a polycarboxylic acid,
- (d) 0.1 to 40 parts by weight of at least one terminal, cycloaliphatic or heterocyclic epoxy compound,
- (e) 0 to 40 parts by weight of a component comprising at least one compound selected from the group consisting of quaternary ammonium compounds, primary amines, secondary amines, carboxamides, N-substituted carboxamides, epoxidized alkoxysilanes, C—H-acidic compounds and mixtures thereof, said resin paste optionally being admixed with one or more additional ingredients selected from the group consisting of thermoplasts, initiators, inhibitors, mold release agents, fillers, absorbents, processing additives, wetting and dispersing additives, air release additives, shrinkage modifiers, and colorants, to obtain a resin-fiber intermediate product and maturing said intermediate product for a time sufficient to obtain a non-sticky compound suitable for sheet molding, for thick molding or for bulk molding.

In several preferred embodiments of the process the composition of the resin paste employed in the process corresponds to the preferred compositions described above for the resin paste itself.

Still another object of the present invention is a molded article obtainable by molding a molding compound obtained according to the above process under elevated pressure at 120 to 200° C.

As the chemistry of resins based on renewable resources in general is completely different from that of SMC, TMC and BMC based on UP or VE resins, also the thickening reaction is completely different in terms of its chemical nature. Accordingly, one would not assume to achieve the same behavior in the thickening reaction. However, it was surprisingly found that it is possible to achieve a thickening behavior in resins based on epoxidized plant oils that is similar to the thickening behavior of UP or VE resins in conventional SMC, TMC or BMC. A shelf life or processability of several weeks which is important for the applicability of the material in practice can also be achieved.

Surprisingly it was now found that mold flow behavior of SMC, TMC and BMC based on resins made from epoxidized plant oils is also comparable to that of conventional SMC, TMC and BMC in spite of the fact that the thickening reactions are completely different from those in conventional SMC, TMC and BMC based on UP or VE resins.

Additionally, it was surprisingly found that glass fibers which are conventionally used in the production of SMC together with unsaturated polyester (UP) and vinyl ester (VE) resins and that possess sizings compatible with these UP and VE resin systems can be used together with the resin systems based on renewable resources as according to the invention. In spite of the sizing on the glass fiber and the resin being completely different in chemical nature and not being adapted to each other, the dispersion of the glass fibers in the resin is very good and fiber/matrix interaction is on a level that leads to mechanical properties of the compound that are comparable to those of conventional SMC based on UP resins.

Surprisingly it was also found that the resins used in the present invention are perfectly compatible with conventional mold release agent from the family of metal stearates.

Figure 1:
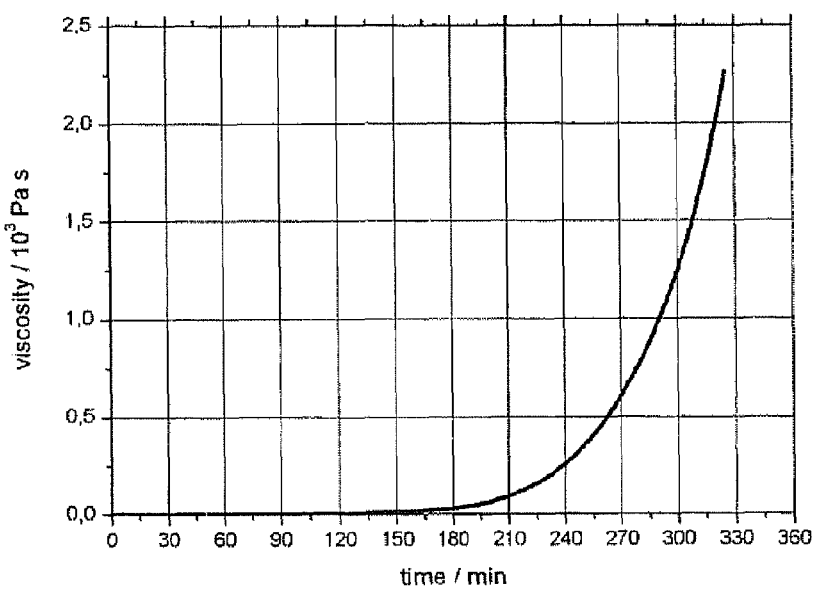
FIG. 1 depicts the thickening behaviour of an unsaturated polyester resin with MgO as thickening agent. The graph shows the increase in viscosity in the first five and a half hours Usually, after two days a viscosity level of $5*10^4$ to $1*10^5$ Pa s is reached which allows to process the SMC.

The invention is illustrated in more detail by the following non-limiting examples showing exemplary embodiments.

EXAMPLE 1

Thickening with Quarternary Ammonium-Charged Vermiculite

Vermiculite with an average particle size of 40 μm was charged with trimethylstearylammonium ions to its capacity limit. 4.0 wt. % of the charged layer silicate was mixed with 0.1 wt. % of glycidyl laurate and 52.5 wt. % of epoxidized linseed oil with an epoxy number of 0.52 and 39.5 wt. % methyltetrahydrophihalic anhydride with an equivalent mass of 183 g/eq and 3.9 wt. % of an initiator/accelerator solution made of 53 wt. % glycerol, 10 wt. % citric acid and 37 wt % imidazole.

The mixture was packed into a PE film. After a maturing time of 14 days the product possessed a leather-like consistency, the film could be removed and the product could be molded at a temperature of 140° C. and cured to obtain a hard duromeric material.

EXAMPLE 2

Thickening with Quaternary Ammonium-Charged Montmorillonite

Montmorillonite with an average particle size of 60 μm was charged with trimethylcetylammonium ions to its capacity limit 4.2 wt. % of the charged layer silicate was mixed with 5.0 wt. % of 1,4-cyclohexanedimethanol diglycidyl ether (Polypox® R11, UPPC AG, Mietingen-Baltringen, Germany) which was vacuum distilled before use, 49.3 wt. % of epoxidized linseed oil with an epoxy number of 0.52, 37.3 wt. % of methyltetrahydrophthalic anhydride with an equivalent mass of 183 g/eq and 4.2 wt. % of the initiator/accelerator solution of Example 1.

The mixture was packed into a PE film. After a maturing time of 14 days the product possessed a leather-like consistency, the film could be removed and the product could be molded at a temperature of 140° C. and cured to obtain a hard duromeric material.

EXAMPLE 3

Thickening with Mixed Diepoxides 3.0 wt. % of methyl 10-aminodecanoate were mixed with 11.8 wt. % of limonene dioxide, 52.5 wt. % of epoxidized linseed oil with an epoxy number of 0.56, 29.7 wt. % of citraconic anhydride with an equivalent mass of 120 g/eq, and 4.0 wt. % of an initiator/accelerator solution made of 57 wt. % of 1,3-butanediol, 5 wt. % of citric acid and 38 wt. % diazabicyclooctane (DABCO®).

The mixture was packed into a PE film. After a maturing time of 10 days the product possessed a leather-like consistency, the film could be removed and the product could be molded at a temperature of 140° C. and cured to obtain a had duromeric material.

EXAMPLE 4

Thickening with Amines and Cycloaliphatic Diepoxides 1.0 wt. % of the charged vermiculite of Example 1 was mixed with 4.8 wt. % of aminotriglycerides with an amine number of 500 (Merginanid® 500, Hobum Oleochemicals GmbH, Hamburg, Germany), 9.6 wt. % of 3,4-epoxycyclohexylmethyl 3',4'-epoxycyclohexanecarboxylate, 45.9 wt. % of epoxidized linseed oil with an epoxy number of 0.52, 34.7 wt. % of methyltetrahydrophthalic anhydride with an equivalent mass of 183 g/eq and 4.0 wt. % of the initiator/-accelerator solution of Example 1.

The mixture was packed into a PE film. After a maturing time of 12 days the product possessed a leather-like consistency, the film could be removed and the product could be molded at a temperature of 160° C. and cured to obtain a hard duromeric material.

EXAMPLE 5

Thickening with Epoxysilane-Modified Quartz and Amines

100 Parts by weight of quartz powder with an average particle size of 100 μm were modified with 10 parts by weight of (3-glycidyloxypropyl)trimethoxysilane. 29.0 wt. % of the modified quartz powder were mixed with 3.8 wt. % of aminotriglycerides with an amine number of 200 (Merginamid® 200, Hobum Oleochemicals GmbH, Hamburg, Germany), 36.4 wt % of epoxidized linseed oil with an epoxy number of 0.52, 27.6 wt. % of methyltetrahydrophthalic anhydride with an equivalent mass of 183 g/eq and 3.2 wt. % of the initiator/accelerator solution of Example 1.

The mixture was packed into a PE film. After a maturing time of 10 days the product possessed a leather-like consistency, the film could be removed and the product could be molded at a temperature of 140° C. and cured to obtain a hard duromeric material.

EXAMPLE 6

Thickening with Terminal Epoxy Triglycerides

Hydroxylated sunflower oil with a hydroxy number of 243 was esterified with acrylic acid. 20 parts by weight of the hydroxylated sunflower oil were added to 3 parts by weight of acrylic acid and 0.6 parts by weight of a powdered cation exchanger (H⁺-form). After addition of 2 parts by weight of chloroform the mixture was heated under reflux conditions. After the action had finished the cation exchanger was filtered off and the solvent and other volatile components were distilled off. The product was epoxidized with hydrogen peroxide/formic acid to obtain a terminal epoxy triglyceride having an epoxy number of 0.26, 23.0 wt. % of this epoxidized product was mixed with 4.4 wt. % of 1,6-diaminohexane, 40.0 wt. % of epoxidized linseed oil with an epoxy number of 0.52, 30.0 wt. % of methyltetrahydrophthalic anhydride with an equivalent mass of 183 g/eq and 2.6 wt. % of the initiator/accelerator solution of Example 1.

The mixture was packed into a PE film, After a maturing time of 12 days the product possessed a leather-like consistency, the film could be removed and the product could be molded at a temperature of 160° C. and cured to obtain a hard duromeric material.

EXAMPLE 7

Thickening with Aminosilane-Modified Cristobalite and Cycloaliphatic Diepoxides 100 parts by weight of cristobalite powder with an average particle size of 100 μm were modified with 10 parts by weight of N-(n-butyl)-3-aminopropyltrimethoxysilane (Dynasylan® 1189, Degussa). 30.0 wt. % of the modified cristobalite powder were mixed with 16.0 wt. % of 3,4-epoxycyclohexylmethyl 3',4'-epoxycyclohexanecarboxylate, 29.3 wt. % of epoxidized linseed oil with an epoxy number of 0.52, 22.2 wt. % of methyltetrahydrophthalic anhydride with an equivalent mass of 183 g/eq, and 2.5 wt. % of the initiator/accelerator solution of Example 1. The mixture was packed into a PE film. After a maturing time of 10 days the product possessed a leather-like consistency, the film could be removed and the product could be molded at a temperature of 140° C. and cured to obtain a hard duromeric material.

EXAMPLE 8

Thickening with CH-Acidic Compounds and Cycloaliphatic Diepoxides 3.7 wt. % of tert-butyl acetoacetate was mixed with 8.7 wt. % of 3,4-epoxycyclohexylmethyl 3',4'-epoxycyclohexanecarboxylate, 54.7 wt. % of epoxidized linseed oil with an epoxy number of 0.56, 29.2 wt. % of citraconic anhydride with an equivalent mass of 120 g/eq, and 3.7 wt. % of the initiator/accelerator solution of Example 3.

The mixture was packed into a PF film. After a maturing time of 12 days the product possessed a leather-like consistency, the film could be removed and the product could be molded at a temperature of 140° C. and cured to obtain a hard duromeric material.

EXAMPLE 9

Thickening with Phenolic Compounds and Cycloaliphatic Diepoxides 4.0 wt. % of cashew nut shell liquid was mixed with 10.0 wt. % of 3,4-epoxycyclohexylmethyl 3',4'-epoxycyclohexanecarboxylate, 47.9 wt. % of epoxidized linseed oil with an epoxy number of 0.52, 36.1 wt. % of methyltetrahydrophthalic anhydride with an equivalent mass of 183 g/eq, and 4.0 wt. % of the initiator/accelerator solution of Example 1.

The mixture was packed into a PE film. After a maturing time of 10 days the product possessed a leather-like consistency, the film could be removed and the product could be molded at a temperature of 140° C.

EXAMPLE 10

Molding of a Sample Plate

A typical formulation of a SMC based on a resin made from epoxidized plant oils is given in Table 2 below.

TABLE 2

| SMC based on a resin made from epoxidized plant oil for molding sample plates for mechanical tests | | |
|---|---|---|
| Ingredient | Weight/kg | Type |
| Resin | 3.470 | Epoxidized linseed oil (epoxy number 0.52) |
| Thickener 1 | 0.520 | 0.26 kg quaternary ammonium-charged layered silicate (cf. Ex-ample 1) + 0.26 kg initiator/accelerator solution (cf. Example 1) |
| Thickener 2 | 0.0065 | Glycidyl laurate |
| Curing agent | 2.500 | Methyltetrahydrophthalic anhydride, anhydride equivalent: 183 |
| Thermoplast | 0.600 | LD polyethylene powder, e.g. Microthene ® (Equistar Chemicals, Houston, TX) or Coathylene ® (DuPont Polymer Powders SARL; Bulle, Switzerland) |
| Absorber | 0.150 | Molecular sieve, e.g. UOP (Baylith ®) powder (UOP M.S., S.r.l., Reggio Calabria, Italy) |
| Filler | 3.200 | Aluminum hydroxide, e.g. Martinal ® ON, Martinal ® ON-310, Martinal ® OL-104 (Martinswerk GmbH, Bergheim, Germany) or Alolt 38 AF (MAL, Budapest, Hungary) |
| Nanofiller | 0.800 | Barium sulfate (e.g. Sachtoperse ®, Sachtleben Chemie GmbH, Duisburg, Germany), titanium dioxide (e.g. Kronos ® 2160, Kronos Titan GmbH, Leverkusen, Germany) or silica (e.g. Aerosil ® R972, Degussa AG, Frankfurt, Germany) |
| Release agent | 0.060 | Calcium stearate |
| Additive | 0.350 | Processing additive (e.g. BYK ®-P 9061, Byk Chemie GmbH; Wesel Germany) |
| Additive | 0.040 | Wetting and dispersing additive (e.g. BYK ®-9076, Byk Chemie) |
| Additive | 0.040 | Air release additive (e.g. BYK ®-A 555, Byk Chemie) |
| Reinforcement | 30% | Glass fiber roving (e.g. Vetrotex P204/2400 tex, OCF R07/2400 tex or Johns Manville T254/2400 tex) |

Figure 2:
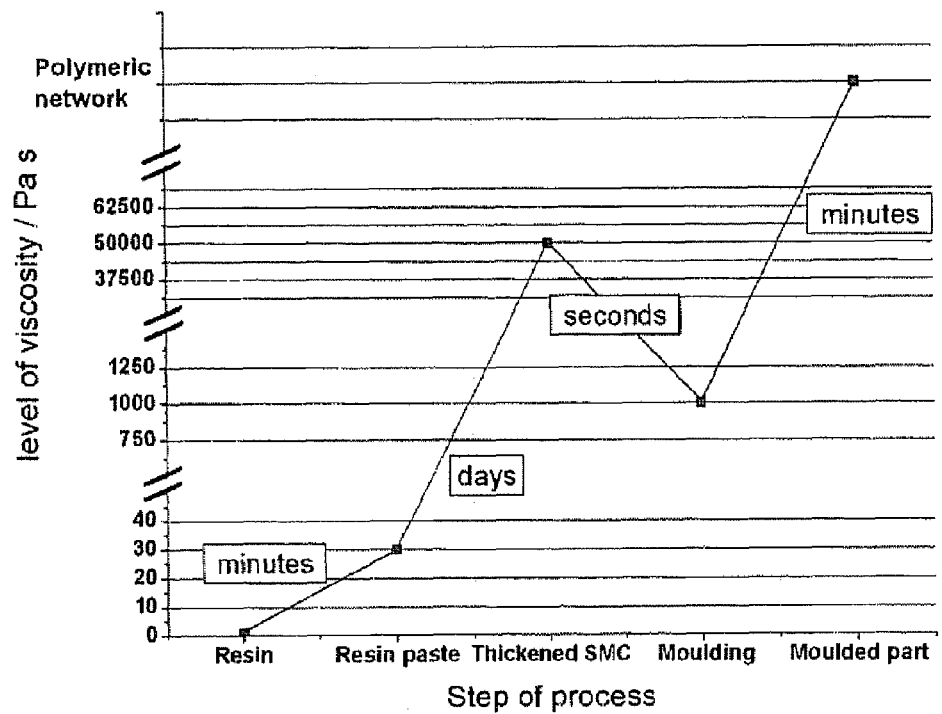
FIG. 2 depicts the development of the required viscosity levels in time in the SMC process.

The thickener components (526.5 g) and 1 kg of the epoxidized linseed oil (resin component) were mixed to obtain a homogeneous liquid which was then mixed in a dissolver with the remaining ingredients except the glass fibers and the SMC was produced as described in the section "SMC production" above The SMC was stored at room temperature for maturation. After one week thickening had taken place according to the reactions described above. After maturation or thickening, the SMC could be cut into pieces of desired size and shape and molded articles could be produced in a molding process at high temperature and high pressure. As can be seen in FIG. 1, the thickening of this resin system reaches a plateau similar to that in the thickening of UP resins FIG. 2 depicts the results of penetrometer measurements of an SMC according to the invention and conventional UP-based SMC with alkaline earth oxides and/or hydroxides as thickeners.

The time window in which the material can be processed is between the 6th and the 20th day after production of the material. This is a shelf life which is somewhat shorter than that of conventional SMC but still sufficient to render possible conventional handling of the material, i.e., production, storage and maturation, shipping to the customers, storage at the customers' location, and processing at standard temperatures and pressure.

For the measurement of mechanical properties of such material, sample plates were molded on a chrome-plated flat sample tool with a size of 250×120 mm². The molding parameters are given in Table 3 below:

TABLE 3

Molding parameters for the molding of sample plates of the SMC of Example 10.

| | |
|---|---|
| Molding force/kN | 500 |
| Molding temperature/° C. | 155 |
| Molding time/s | 500 |
| Pre-cut/% | 70 |
| Weight/g | 190 |

The sample plates are used e.g., to cut specimens for the determination of mechanical properties according to German Industry Standard DIN ISO 527 (tensile strength and modulus), DIN ISO 14125 (flexural strength and modulus), and DIN ISO 179 (impact strength).

Mechanical properties of this SMC compared to those of standard low emission SMC based on UP resin are given in Table 4 below.

TABLE 4

Mechanical properties of SMC according to Example 10 and low emission SMC based on UP resin (HUP 12/30 LE).

| | Standard | HUP 12/30 LE | Example 10 |
|---|---|---|---|
| Density/g · cm$^{-3}$ | ISO 1183 A | 1.896 | 1.688 |
| Shrinkage/% | ISO 2577 | −0.0172 | 0.0581 |
| Tensile Modulus/N · mm$^{-2}$ | ISO 527 | 10632 (444) | 9674 (621) |
| Flexural Modulus/N · mm$^{-2}$ | ISO 14125 | 9839 (756) | 8927 (721) |
| Tensile Strength/N · mm$^{-2}$ | ISO 527 | 77 (3) | 108 (11) |
| Flexural Strength/N · mm$^{-2}$ | ISO 14125 | 147 (15) | 204 (13) |
| Impact Strength/kJ · m$^{-2}$ | ISO 179 | 86 (7) | 108 (13) |

Standard deviations are given in brackets, where determined.

As can be seen from the table, the moduli of material molded from SMC according to Example 10 and standard SMC are comparable, whereas the strengths of the new material are significantly higher. Shrinkage is significantly higher and density much lower compared to standard SMC. In general the material is applicable to mold parts in a way which is generally attributed to SMC.

As the resin is based on renewable resources, it is interesting to check the consistency of the material, i.e., how constant mechanical properties can be realized in SMC according to the invention when different batches of material are used. In Table 5 the mechanical properties of three samples having essentially the same basic formulation are compared with regard to their mechanical properties.

TABLE 5

Mechanical properties of three samples of a SMC based on the formulation of Example 10 prepared from different batches.

| | Standard | Batch 1 | Batch 2 | Batch 3 |
|---|---|---|---|---|
| Density/g · cm$^{-3}$ | ISO 1183 A | 1.630 | 1.688 | 1.656 |
| Shrinkage/% | ISO 2577 | 0.0815 | 0.0581 | 0.0464 |
| Tensile Modulus/N · mm$^{-2}$ | ISO 527 | 8178 (142) | 9674 (621) | 7695 (317) |
| Flexural Modulus/N · mm$^{-2}$ | ISO 14125 | 9008 (1973) | 8927 (721) | 8517 (1422) |
| Tensile Strength/N · mm$^{-2}$ | ISO 527 | 97 (11) | 108 (11) | 87 (17) |
| Flexural Strength/N · mm$^{-2}$ | ISO 14125 | 206 (58) | 204 (13) | 197 (32) |
| Impact Strength/kJ · m$^{-2}$ | ISO 179 | 93 (7) | 108 (13) | 98 (14) |

Standard deviations are given in brackets where determined.

It can be seen that there are slight variations in mechanical properties which are not decisive from a practical point of view. Considering the fact that the raw material stems from natural resources these variations are surprisingly small.

The glass transition point can be determined by DMA measurement in a three-point bending arrangement By referring to the maximum of tan δ a glass transition point of $T_g$=66.8° C. was determined for the material of batch 2.

EXAMPLE 11

Molding of a Structural Part

With SMC based on resins made of epoxidized plant oils also parts with complex shapes can be molded. The formulation of the resin system is according to Example 1.

TABLE 6

Formulation of SMC for the molding of a structural part.

| Ingredient | Weight/kg | Type |
|---|---|---|
| Resin component | 3.470 | Epoxidized linseed oil (epoxy number: 0.52) |
| Thickener 1 | 0.520 | See Example 10 |
| Thickener 2 | 0.0065 | Glycidyl laurate |
| Curing agent | 2.500 | Methyltetrahydrophthalic anhydride, anhydride equivalent: 183 |
| Thermoplast | 0.600 | LD polyethylene powder |
| Absorber | 0.150 | Molecular sieve (cf. Table 2) |
| Filler | 3.200 | Aluminum hydroxide (cf. Table 2) |
| Nanofiller | 0.800 | Barium sulfate (cf. Table 2) |
| Release agent | 0.060 | Calcium stearate |
| Additive | 0.350 | Processing additive (cf. Table 2) |
| Additive | 0.040 | Wetting and dispersing additive (cf. Table 2) |
| Additive | 0.040 | Air release additive (cf. Table 2) |
| Pigment | 0.060 | Soot pigment paste 25% |
| Reinforcement | 35% | Glass fiber roving (cf. Table 2) |

The thickener components (526.5 g) and 1 kg of the resin component were dissolved as described in Example 10. The obtained solution was mixed in a dissolver with all remaining ingredients except the glass fibers and the SMC was produced as described in the section "SMC production". The SMC was stored at room temperature for maturation. After one week thickening had taken place. After maturation/thickening the SMC could be cut into pieces of desired size and shape and molded articles could be produced in a molding process at high temperature and high pressure.

To check the mold flow behavior in complex tools an interior door module with a large number of ribs and bosses was molded. The molding parameters are given in Table 7 below.

TABLE 7

Molding parameters for the molding of a interior door module

| | |
|---|---|
| Molding force/kN | 3600 |
| Molding temperature/° C. | 150 |
| Molding time/s | 400 |
| Pre-cut/% | 60 |
| Weight/g | 1700 |

The mold flow behavior was comparable to standard SMC and the mold cavity was easily filled with the material.

EXAMPLE 12

SMC Based on Epoxidized Plant Oil Resin with Extremely Low Emissions

To produce a SMC with extremely low emissions suitable for application in an automotive interior the formulation was reduced to the ingredients that are absolutely necessary for the SMC according to the invention and all ingredients which could cause emission of volatile compounds were avoided The formulation is given in Table 8 below.

TABLE 8

Formulation of SMC for lowest possible emissions.

| Ingredient | Weight/kg | Type |
|---|---|---|
| Resin | 4.653 | Epoxidized linseed oil with an epoxy number of 0.52 |
| Thickener 1 | 0.818 | 409 g quaternary ammonium salt-modified layered silicate (cf. Example 2) mixed with 409 g initiator/accelerator solution (cf. Example 2) to give a paste |
| Thickener 2 | 0.487 | 1,4-Cyclohexanedimethanol diglycidyl ether |
| Curing agent | 3.750 | Methyltetrahydrophthalic anhydride (anhydride equivalent: 183) |
| Thermoplast | 0.850 | LD polyethylene powder |
| Filler | 4.800 | Calcium carbonate |
| Nanofiller | 1.200 | Barium sulfate |
| Release agent | 0.450 | Calcium stearate |
| Absorber | 0.300 | Molecular sieve (cf. Table 2) |
| Pigment | 0.100 | Soot pigment paste 25% |
| Reinforcement | 30% | Glass fiber roving (cf. Table 2) |

The thickener components and 950 g of the epoxidized linseed oil were mixed. After a homogeneous mixture had been obtained, it was mixed in a dissolver with all remaining ingredients except the glass fibers and the SMC was produced as described in the section "SMC production". The SMC was stored at room temperature for maturation. After one week thickening had taken place. After maturation/thickening the SMC could be cut into pieces of desired size and shape and molded articles could be produced in a molding process at high temperature and high pressure. For the measurement of mechanical properties sample plates were molded on a chrome-plated flat sample tool with a size of 250×120 mm$^2$. The molding parameters are given in Table 9 below:

TABLE 9

Molding parameters for the molding of sample plates according to Example 12

| | |
|---|---|
| Molding force/kN | 50 |
| Molding temperature/° C. | 155 |
| Molding time/s | 500 |
| Pre-cut/% | 70 |
| Weight/g | 190 |

Specimens were cut from the sample plates and volatile organic compounds were determined according to VDA 277. A triple determination of total volatile organic compounds yielded the following values: 13.6 ppm, 14.0 ppm and 14.1 ppm, which corresponds to a mean value of 13.9 ppm VOC. This VOC value is extremely low and more than one order of magnitude lower than what is currently standard in conventional SMC. Consequently, such a material is perfectly suited for parts in automotive interior. The mechanical properties of this material were determined to check whether the strength of the material had suffered from the above modifications. As can be seen from Table 10 below, the mechanical properties are still on the same level as those of other formulations which include additives contributing to higher organic emissions.

TABLE 10

Mechanical properties of a SMC based on epoxidized plant oil resin with extremely low emissions.

| | Standard | Example 12 |
|---|---|---|
| Density/g · cm$^{-3}$ | ISO 1183 A | 1.656 |
| Shrinkage/% | ISO 2577 | 0.0464 |
| Tensile Modulus/N · mm$^{-2}$ | ISO 527 | 7695 (317) |
| Flexural Modulus/N · mm$^{-2}$ | ISO 14125 | 8517 (1422) |
| Tensile Strength/N · mm$^{-2}$ | ISO 527 | 87 (17) |
| Flexural Strength/N · mm$^{-2}$ | ISO 14125 | 197 (32) |
| Impact Strength/kJ · m$^{-2}$ | ISO 179 | 98 (14) |

EXAMPLE 13

SMC Based on Epoxidized Plant Oil with Accelerated Thickening

As the maturation time of SMC according to the invention is somewhat longer than that of conventional SMC it was checked whether maturation can be accelerated. It was found that by slightly changing the resin system while maintaining the rest of the formulation the maturation time can be reduced. The formulation used is given in Table 11 below, the basic formulation of the resin system being essentially the same as in Example 2.

TABLE 11

SMC based on epoxidized plant oil with accelerated thickening

| Ingredient | Weight/kg | Type |
|---|---|---|
| Resin component | 3.750 | Epoxidized linseed oil (epoxy number: 0.52) |

TABLE 11-continued

SMC based on epoxidized plant oil with accelerated thickening

| Ingredient | Weight/kg | Type |
|---|---|---|
| Thickener 1 | 0.800 | 400 g quaternary ammonium salt-modified montmorillonite, mixed with 400 g initiator/accelerator solution (cf. Example 2) into a paste |
| Thickener 2 | 0.467 | 1,4-Cyclohexanedimethanol diglycidyl ether (cf. Example 2) |
| Curing agent | 3.750 | Methyltetrahydrophthalic anhydride (anhydride equivalent: 183) |
| Thermoplast | 0.850 | LD polyethylene powder |
| Filler | 4.800 | Calcium carbonate |
| Nanofiller | 1.200 | Barium sulfate |
| Release agent | 0.450 | Calcium stearate |
| Absorber | 0.300 | Molecular sieve (cf. Table 2) |
| Pigment | 0.100 | Soot pigment paste 25% |
| Reinforcement | 30% | Glass fiber roving (cf. Table 2) |

Figure 3:
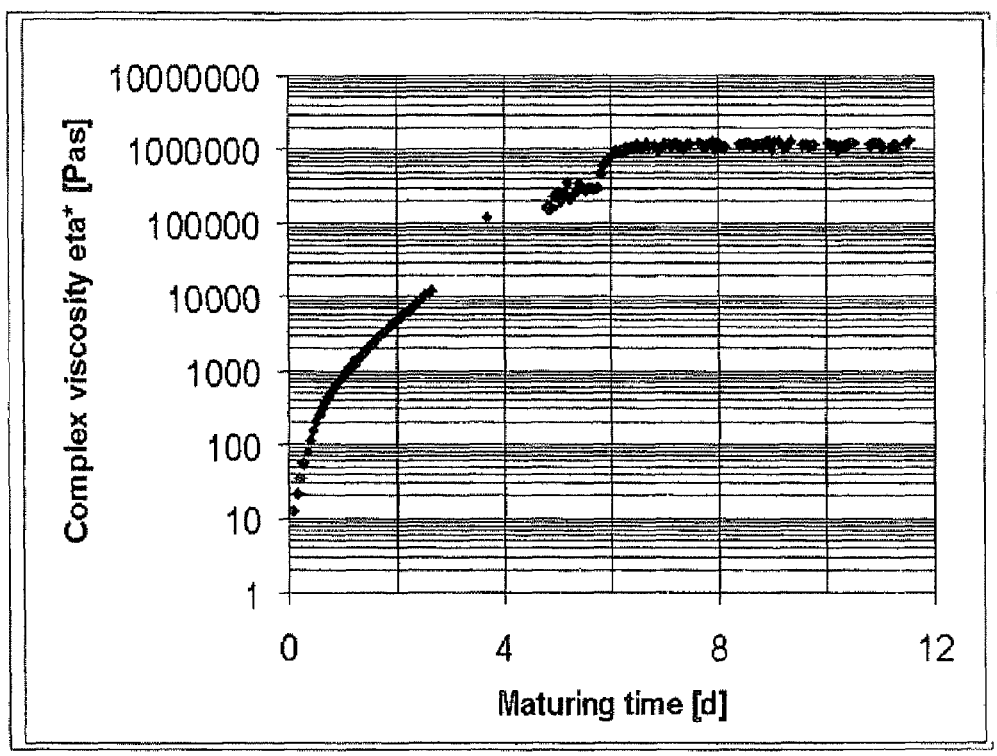
FIG. 3 depicts the thickening behavior of a SMC paste according to the invention as given by the complex viscosity η* determined in a plate-plate viscosimeter.
Figure 4:
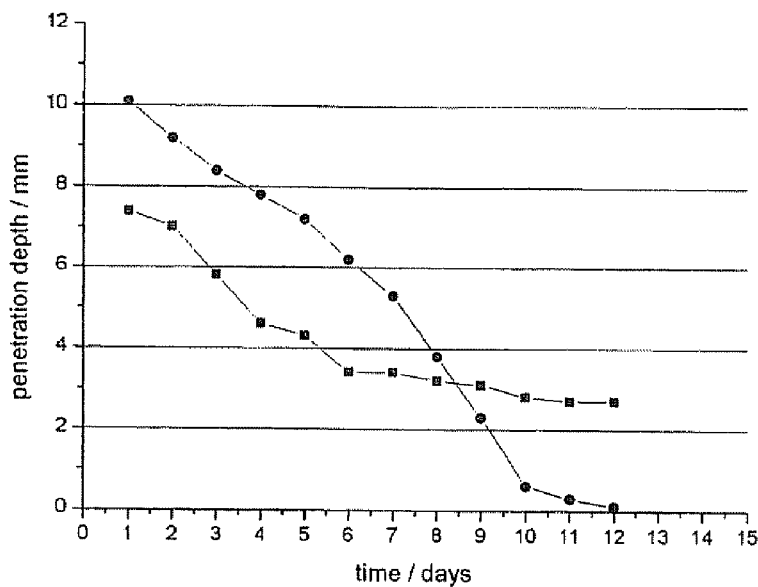
FIG. 4 depicts the thickening behavior of a standard SMC ("HUP 12/30", solid squares (■)), and an SMC according to the invention (solid circles (●)), as determined by penetrometer measurement.
Figure 5:
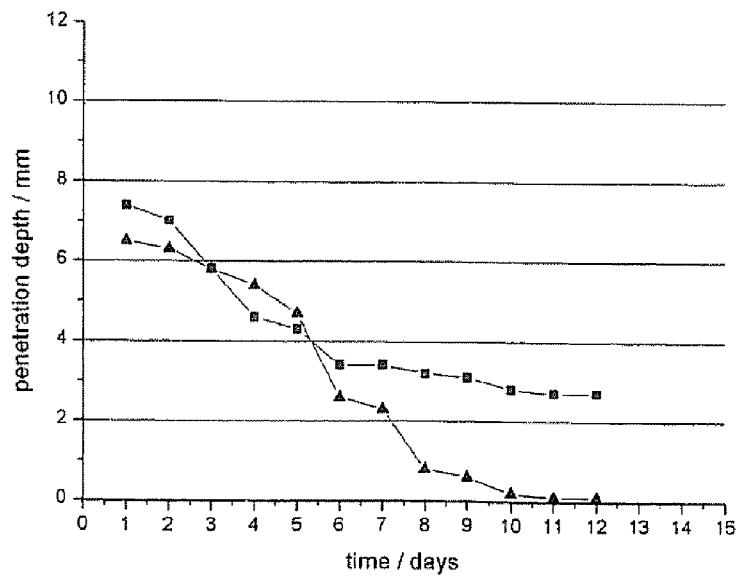
FIG. 5 depicts the thickening behavior of a standard SMC ("HUP 12/30", solid squares (■)), and another SMC according to the invention (solid triangles (▲)), as determined by penetrometer measurement.

The thickening behavior of epoxidized plant oil-based SMC with accelerated thickening as compared to that of a standard SMC HUP 12/30 (determined by penetrometer measurement) is depicted in FIG. 3. It turned out that within the first six days the rate of thickening is comparable to standard SMC. It was further found that the molding behavior is comparable for both SMC systems.

EXAMPLE 14

SMC Based on Epoxidized Plant Oil with Higher Glass Transition Point

A formulation of SMC according to the invention with increased glass transition temperature was prepared according to Table 12 below, using essentially the same basic formulation as described in Example 4.

TABLE 12

Formulation of epoxidized plant oil-based SMC with increased glass transition temperature.

| Ingredient | Weight/kg | Type |
|---|---|---|
| Resin component | 2.813 | Epoxidized linseed oil (epoxy number: 0.52) |
| Thickener 1 | 0.114 | Aminotriglycerides (amine number: 500) |
| Thickener 2 | 0.675 | 3,4-Epoxycyclohexylmethyl 3',4'-epoxycyclohexane-carboxylate |
| Initiator/accelerator | 0.225 | Glycerol/citric acid/imidazole (cf. Example 2) |
| Curing agent | 3.213 | Methyltetrahydrophthalic anhydride (anhydride equivalent: 183) |
| Thermoplast | 0.600 | LD polyethylene powder |
| Absorber | 0.150 | Molecular sieve (cf. Table 2) |
| Filler | 3.000 | Calcium carbonate |
| Release agent | 0.060 | Calcium stearate |
| Additive | 0.350 | Processing additive (cf. Table 2) |
| Additive | 0.040 | Wetting and dispersing additive (cf. Table 2) |
| Additive | 0.040 | Air release additive (cf. Table 2) |
| Pigment | 0.060 | Soot pigment paste 25% |
| Reinforcement | 30% | Glass fiber roving (cf. Table 2) |

The thickener components, the initiator/accelerator solution and 200 g of the epoxidized linseed oil. All ingredients except the glass fibers were mixed in a dissolver and the SMC was produced as described in the section "SMC production". The SMC was stored at room temperature for maturation. After one week thickening had taken place After maturation/thickening the SMC could be cut into pieces of desired size and shape and molded articles could be produced in a molding process at high temperature and high pressure For the measurement of mechanical properties sample plates were molded on a chrome-plated flat sample tool with a size of 250×120 mm². The molding parameters are given in Table 13 below:

TABLE 13

Molding parameters for the molding of sample plates of epoxidized plant oil-based SMC with increased glass transition temperature.

| Molding force/kN | 50 |
|---|---|
| Molding temperature/° C. | 155 |
| Molding time/s | 500 |
| Pre-cut/% | 70 |
| Weight/g | 190 |

The glass transition point can be determined by DMA measurement in a three-point bending arrangement. By referring to the maximum of tan δ a glass transition point of $T_g=130°$ C. was determined for the materials.

The invention claimed is:

1. A resin paste for the application in a sheet molding compound, a thick molding compound, or a bulk molding compound, said resin paste comprising:
    (a) 40 to 70 wt %, based on the overall resin paste, of at least one epoxidized triglyceride having at least two epoxy groups,
    (b) 25 to 45 wt %, based on the overall resin paste, of at least one anhydride of a polycarboxylic acid,
    (c) 0.01 to 10 wt %, based on the overall resin paste, of a polycarboxylic acid,
    (d) 0.1 to 20 wt %, based on the overall resin paste, of at least one terminal, cycloaliphatic or heterocyclic epoxy compound, and
    (e) an optional component comprising at least one compound selected from the group consisting of quaternary ammonium compounds, primary amines, secondary amines, carboxamides, N-substituted carboxamides, epoxidized alkoxysilanes, C—H-acidic compounds and mixtures thereof.

2. The resin paste of claim 1, wherein the component (e) comprises at least one quaternary ammonium compound.

3. The resin paste of claim 1, wherein the component (e) comprises a primary or secondary amine or a mixture of two or more primary and/or secondary amines.

4. The resin paste of claim 3, wherein the primary or secondary amine or mixture of amines has at least two amino groups.

5. The resin paste of claim 1, wherein the component (e) comprises an epoxidized alkoxysilane.

6. The resin paste of claim 1, wherein the component (e) comprises a C—H-acidic compound.

7. The resin paste of claim 1, wherein at least one of the compounds of component (e) is adsorbed on or covalently bound to a carrier material.

8. The resin paste of claim 7, wherein the carrier material is selected from the group consisting of layered silicates, silica, glass, and mixtures thereof.

9. A sheet molding compound, a thick molding compound or a bulk molding compound comprising:
    the resin paste of claim 1;
    reinforcing fibers; and
    optionally, one or more additional ingredients selected from the group consisting of thermoplasts, initiators, inhibitors, mold release agents, fillers, absorbents, processing additives, wetting and dispersing additives, air release additives, shrinkage modifiers, and colorants.

10. The sheet molding compound, thick molding compound or bulk molding compound of claim 9, wherein the reinforcing fibers are glass fibers.

11. A process for manufacturing an article, said process comprising molding the sheet molding compound, thick molding compound or bulk molding compound of claim 9 under elevated pressure at 120 to 200° C.

12. A molded article comprising a reaction product of:
   (i) the resin paste of claim 1;
   (ii) reinforcing fibers; and
   (iii) optionally, one or more additional ingredients selected from the group consisting of thermoplasts, initiators, inhibitors, mold release agents, fillers, absorbents, processing additives, wetting and dispersing additives, air release additives, shrinkage modifiers, and colorants.

13. A process for preparing a sheet molding compound, a thick molding compound or a bulk molding compound, said process comprising:
   preparing a resin paste;
   optionally mixing the resin paste with one or more additional ingredients;
   impregnating reinforcing fibers with said resin paste to obtain a resin-fiber intermediate product; and
   maturing said intermediate product for a time sufficient to obtain a non-sticky compound suitable for sheet molding, thick molding or bulk molding;
   wherein said resin paste comprises:
   (a) 40 to 70 wt %, based on the overall resin paste, of at least one epoxidized triglyceride having at least two epoxy groups,
   (b) 25 to 45 wt %, based on the overall resin paste, of at least one anhydride of a polycarboxylic acid,
   (c) 0.01 to 10 wt %, based on the overall resin paste, of a polycarboxylic acid,
   (d) 0.1 to 20 wt %, based on the overall resin paste, of at least one terminal, cycloaliphatic or heterocyclic epoxy compound, and
   (e) an optional component comprising at least one compounds selected from the group consisting of quaternary ammonium compounds, primary amines, secondary amines, carboxamides, N-substituted carboxamides, epoxidized alkoxysilanes, C—H-acidic compounds and mixtures thereof;
   wherein said one or more additional ingredients are selected from the group consisting of thermoplasts, initiators, inhibitors, mold release agents, fillers, absorbents, processing additives, wetting and dispersing additives, air release additives, shrinkage modifiers, and colorants.

14. A process for manufacturing an article, said process comprising:
   preparing a sheet molding compound, a thick molding compound or a bulk molding compound according to the process of claim 13; and
   molding said compound under elevated pressure at 120 to 200° C.

* * * * *